US012769288B2

(12) United States Patent
Tinti

(10) Patent No.: US 12,769,288 B2
(45) Date of Patent: Oct. 20, 2026

(54) DEVICE FOR TESTING SCREWDRIVERS IN AUTOMATIC STATIONS, TEST METHOD AND PLANT

(71) Applicant: SCS CONCEPT S.R.L., Cusano Milanino (IT)

(72) Inventor: Carlo Giuseppe Tinti, Noviglio—Fraz. Santa Corinna (IT)

(73) Assignee: SCS CONCEPT S.R.L., Cusano Milanino (IT)

( * ) Notice: Subject to any disclaimer, the term of this patent is extended or adjusted under 35 U.S.C. 154(b) by 530 days.

(21) Appl. No.: 18/245,878

(22) PCT Filed: Sep. 21, 2021

(86) PCT No.: PCT/IB2021/058573
§ 371 (c)(1),
(2) Date: Mar. 17, 2023

(87) PCT Pub. No.: WO2022/064352
PCT Pub. Date: Mar. 31, 2022

(65) Prior Publication Data
US 2023/0359177 A1 Nov. 9, 2023

(30) Foreign Application Priority Data
Sep. 22, 2020 (IT) ........................ 102020000022261

(51) Int. Cl.
*G05B 19/418* (2006.01)
*G01L 5/24* (2006.01)

(52) U.S. Cl.
CPC .......... *G05B 19/41825* (2013.01); *G01L 5/24* (2013.01); *G05B 2219/45091* (2013.01); *G05B 2219/49196* (2013.01)

(58) Field of Classification Search
None
See application file for complete search history.

(56) References Cited

U.S. PATENT DOCUMENTS

2009/0069937 A1* 3/2009 Battenberg ....... G05B 19/41875 700/254
2010/0324837 A1* 12/2010 Chen ..................... G01L 25/003 702/41
(Continued)

FOREIGN PATENT DOCUMENTS

WO 2018015906 A1 1/2018
WO 2020128744 A1 6/2020

OTHER PUBLICATIONS

International Search Report mailed Oct. 28, 2021, 3 pages.

*Primary Examiner* — Christopher J Fibbi
(74) *Attorney, Agent, or Firm* — Ashurst Perkins Cole US LLP; Jacob Levenson; Viola T. Kung

(57) ABSTRACT

An automatic test device (10) for testing automatic screwdrivers (12) in a robotic station (10) for tightening elements (18) of an object (17) handled in the station comprises a frame (20) suitable for being inserted in a station in place of an object handled in the station; a plurality of screwdriver test heads (21) arranged on the frame (20); a control unit (24) connected to the test head (21) in order to control operation of the test heads (21) and detect tightening parameters of screwdrivers applied to the test heads (21) by the robotic station.

A plant with at least one robotic station (10), a transport line (15) and an automatic test device (10) is also described. Finally, a method for testing automatic screwdrivers in robotic stations is described.

15 Claims, 2 Drawing Sheets

(56) References Cited

U.S. PATENT DOCUMENTS

| | | | | |
|---|---|---|---|---|
| 2016/0195868 | A1* | 7/2016 | Wallgren | H04B 5/72<br>700/114 |
| 2016/0342151 | A1* | 11/2016 | Dey, IV | G06F 3/04817 |
| 2018/0136060 | A1* | 5/2018 | Boccellato | G01L 5/24 |
| 2020/0340878 | A1* | 10/2020 | Celico Fadini | G01L 25/003 |
| 2021/0393337 | A1* | 12/2021 | Zucker | G01L 5/26 |

* cited by examiner

DEVICE FOR TESTING SCREWDRIVERS IN AUTOMATIC STATIONS, TEST METHOD AND PLANT

This application is a National Stage of International Application PCT/IB2021/058573, filed Sep. 21, 2021; which claims the priority of Italian Application No. 102020000022261, filed Sep. 22, 2020. The contents of the above-identified applications are incorporated herein by reference in their entireties.

The present invention relates to an innovative device for testing automatic screwdrivers in robotic stations. The invention also relates to a test method and a plant.

Robotic stations for performing screwing, equipped with a plurality of automatic screwdrivers which automatically perform screwing or tightening operations on objects which enter into the station, are well known. For example, stations of this type for motor vehicle assembly lines and plants are known.

The automated screwdrivers of these stations must be periodically checked for their calibration to ensure that the tightening operations are carried out within predetermined parameters. For this purpose, periodically an operator must disassemble the screwdrivers from the station and test them one by one on a special manual screwdriver test bench. This obviously results in a long downtime of the station.

The general object of the present invention is to provide a test device and a test method which is rapid and efficient, for automatic screwdrivers in robotic stations. A further object is to provide a plant with at least one automatic station having automatic screwdrivers and a system for testing the automatic screwdrivers of the plant.

In view of these objects the idea which has occurred is to provide, according to the invention, a method for testing automatic screwdrivers in a robotic station for tightening elements of an object normally handled in the station, comprising the steps of providing a test device equipped with a plurality of screwdriver test heads and a control unit for controlling the test heads so as to perform screwdriver tests, introducing into the robotic station the test device in place of an object normally handled in the station, and starting a test cycle of the screwdrivers in the station which results in the robotic station coupling the screwdrivers together with corresponding test heads of the test device and performing tightening cycles on the test heads.

Still according to the invention the idea which has occurred is to provide an automatic test device for testing automatic screwdrivers in a robotic station for tightening elements of an object handled in the station, characterized in that it comprises: a frame suitable for being inserted in a station instead of an object handled in the station; a plurality of screwdriver test heads arranged on the frame; a control unit connected to the test heads in order to control the operation of the test heads and detect tightening parameters of screwdrivers applied to the test heads by the robotic station.

Still according to the invention, the idea which has occurred is to provide a plant comprising at least one robotic station equipped with a plurality of automatic screwdrivers intended to tighten elements of an object entering the station, a system for transporting these objects inside and outside the robotic station and the test device, the station being controllable so as to apply the automatic screwdrivers to the test heads of the test device when the test device enters the robotic station in place of an object.

In order to illustrate more clearly the innovative principles of the present invention and its advantages compared to the prior art, an example of embodiment applying these principles will be described below with the aid of the attached drawings. In the drawings.

Figure 1:
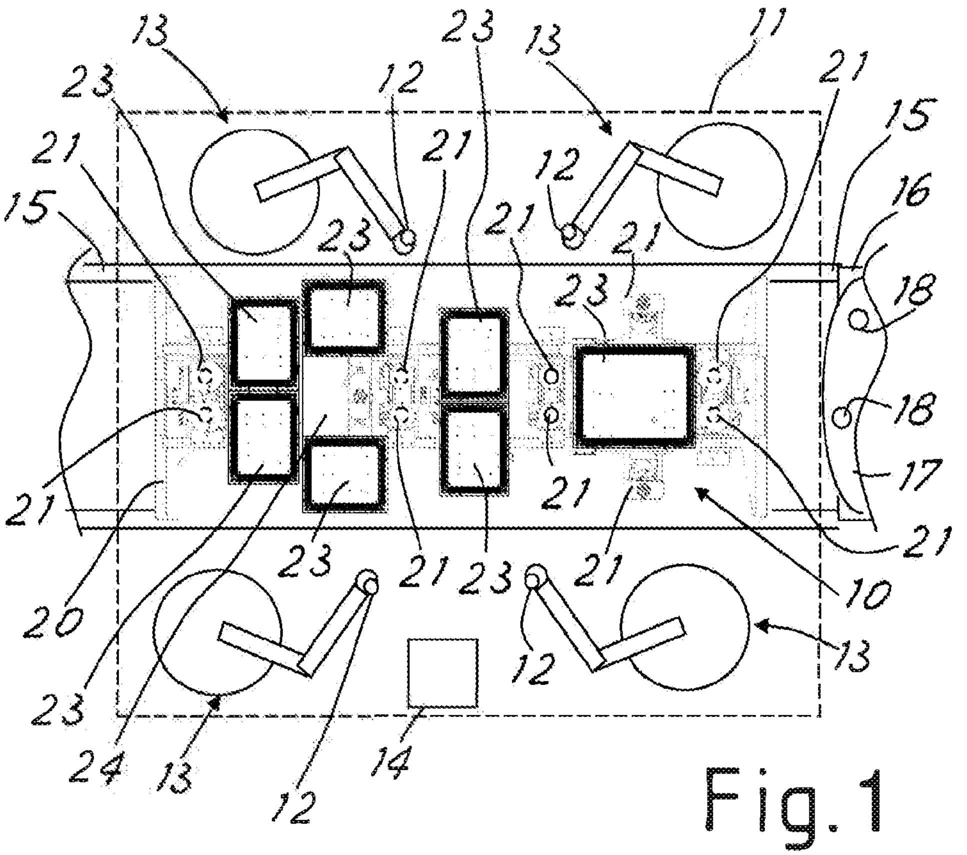
FIG. 1 shows a schematic plan view of an automatic screwing station with, inside, a test device according to the invention.

With reference to the figures, FIG. 1 shows a generic known automatic station 11, the screwdrivers of which must be tested.

In particular, the station 11 will be of the type comprising a plurality of automated screwdrivers 12, each mounted on a positioning unit 13 (for example robot arms) so as to be controlled to operate, by means of a dedicated control program, on one or more known elements 18 to be screwed (for example bolts or other tightening or screw connection systems) of an object 17 introduced into the station (shown partially in FIG. 1 as it leaves the station after the operations carried out in the station).

For example, the object introduced may be a motor vehicle or part thereof and the station may form part of a known line or plant for the treatment and assembly of motor vehicles or parts thereof.

The automated station may furthermore comprise a known control system 14 which controls the tightening operations performed by the screwdrivers of the station, for example based on a pre-set program for moving and operating the screwdrivers on the various members to be tightened. In this case, the control system 14 may also check and/or control the entry of the object in the station and its correct positioning before activating the tightening operations in the station.

Advantageously, the automated station may comprise a transport line or system 15 or may be served by a transport line or system 15 which sequentially transports the objects into the station and removes them once the appropriate tightening program has been completed. This transport system may consist, for example, of a known motorized conveyor of the roller or chain type or equipped with independent motorized carriages.

Although only one station is shown in the figures, a plant may comprise a plurality of stations, for example each dedicated for a particular tightening activity on various elements to be tightened. The stations of the plurality may if necessary be connected by means of the transport system 15 such that the objects 17 may pass sequentially through them. The plant may also comprise known stations dedicated for other object treatment and processing operations (for example operations for sealing or positioning and assembling parts of the objects). All this is well known to the person skilled in the art and therefore will not be further described or shown.

In the plants with automated processing stations there may also be provided at least one known transport frame 16 on which the object to be handled in the station or stations is mounted in order to facilitate transportation thereof inside and outside the station, positioning inside the station and/or possible adaptation for safe movement by means of the transport line 15. For example, this frame may be in the form of a skid, for travel along a suitable transport line, or may be in the form of a suitable carriage. Often the transport frame also provides a precise reference for correct positioning of the object inside the station. This is particularly known for example in the motor vehicle sector.

Stations and plants of this type, any associated transport lines and any transport frames, both for use with motor vehicles and for other uses, are in any case well known to the person skilled in the art and will not be further shown or described in detail here, since they may be easily imagined by the person skilled in the art, also as regards their various embodiments.

Usually, during normal operation of the screwdriver tightening station, an object with the elements to be tightened in the station is transported to the station and positioned inside it (for example by the appropriate transport line). After positioning, the station control system operates the units for positioning the automated screwdrivers so that they are positioned on the respective elements to be tightened (simultaneously and/or in sequence, using the screwdrivers which may consist of a number the same as or a number smaller than the number of elements to be tightened) and the screwdrivers are finally operated so that they carry out the programmed screwing cycle.

At the end of the screwing operations, the screwdrivers are retracted and the object exits the station, in order to continue for example further processing and/or assembly steps, and is replaced by a following object arriving at the station, and so on.

As already mentioned, cyclically, however, it is necessary to check the calibration and correct functioning of the automated screwdrivers of the station or stations.

According to the principles of the present invention, an innovative test device is therefore envisaged—denoted generally by 10 in the figures—said device being inserted in the station in place of an object normally handled by the station. Such a device 10 comprises a frame 20 on which a plurality of screwdriver test heads 21 are present, these being suitably arranged and directed so as to be able to be reached by the screwdrivers of the station to be tested.

The frame 20 may advantageously extend generally in the horizontal directions and with the test heads 21 which project therefrom in the appropriate positions. In particular, the frame may have at least in the horizontal direction dimensions comparable with those of the objects which are normally handled by the station, so that it may be easily accommodated therein instead of one of these objects. For example, in the case where the objects are motor vehicle bodies, the frame may extend lengthwise in the direction of transportation inside and outside the station and with a length and width similar to those of the bodies which are normally handled by the station.

For example, the frame may be made with longitudinal and transverse frame elements which are connected together (for example by means of welding or other system) in order to form a grid-like frame structure. This grid-like structure may be for example substantially flat in a horizontal plane, as shown in the figures by way of example or may also extend vertically in the case where a particular position of the test heads also in the vertical direction is necessary.

Figure 2:
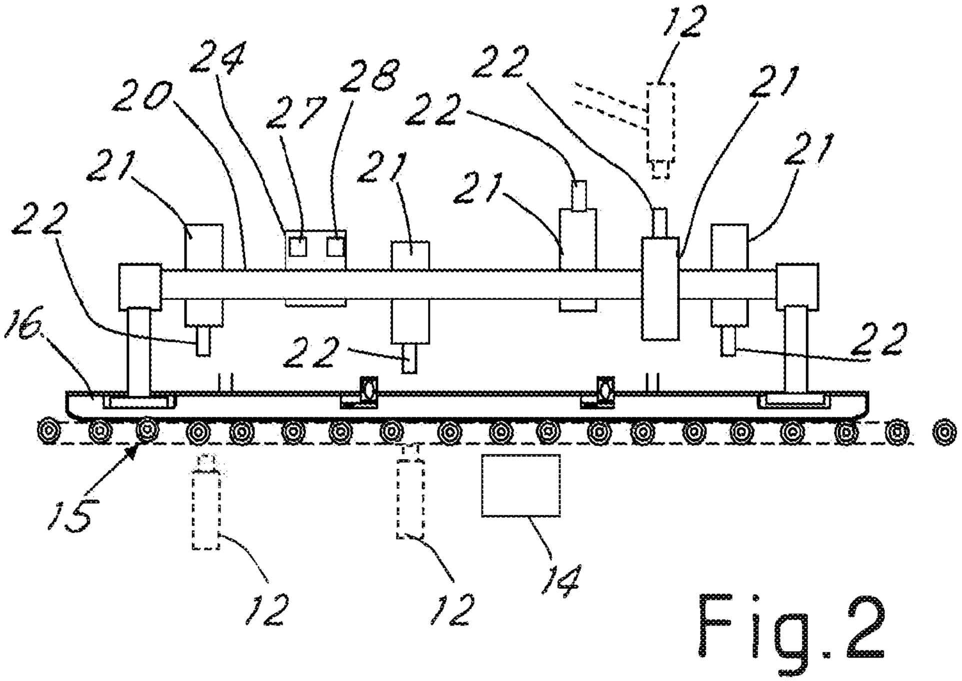
FIG. 2 shows a schematic side elevation view of the station with the device according to FIG. 1.

As can be clearly seen in FIG. 2, if necessary, the device 10 may advantageously comprise, or be mounted on, a transport frame 16 similar to those used for the objects 17 normally handled by the station, so that it may be moved and positioned in the station in a simple manner, as though it were one of the objects normally handled by the station.

In any case, once the device 10 is positioned in the station, the station may controlled so as to perform a test cycle during which the screwdrivers of the station will perform the appropriate screwing cycles on the corresponding test heads 21.

The test heads 21 will each comprise a special coupling 22 (suitable for connection with a corresponding screwdriver) which is braked in a controlled manner so as to simulate the behaviour of a screw being tightened as the screwdriver acts on it, in a manner known per se for screwdriver test benches. For example, each test head may be controlled so that its coupling follows braking curves depending on the angle of rotation and/or torque applied to the coupling.

Moreover, the rotation and/or torques transmitted from the screwdriver to the coupling may be measured by suitable known angle and torque sensors present in the head.

As is known for screwdriver test systems, the braking of the coupling may be performed by means of a special brake, for example hydraulically controlled brake, which is suitably driven so as to follow the predefined parameters and simulation curves of a type of screw coupling, allowing the test system to detect the behaviour of the screwdriver by measuring the torque and angle values during the test cycle and comparing them for example with parameters which were predefined as correct in the case of a screwdriver functioning correctly. For example, a test may envisage that each screwdriver must stop when a predefined torque is reached after performing a suitable rotation. Obviously, other types of test for the screwdrivers, well known per se to the person skilled in the art, may also be envisaged, depending on the wishes and needs.

For control of the test heads, each test head 21, as shown in FIG. 1, may for example be associated with a corresponding control system 23 for controlling the braking parameters. In the case of test heads with hydraulic brakes, these control systems may be of the electrohydraulic type.

A central control unit 24 on-board the device 10 may control the appropriate braking cycles of all the test heads and detect the corresponding angle and torque data in order to establish the correct operation of the station screwdrivers being tested.

Figure 3:
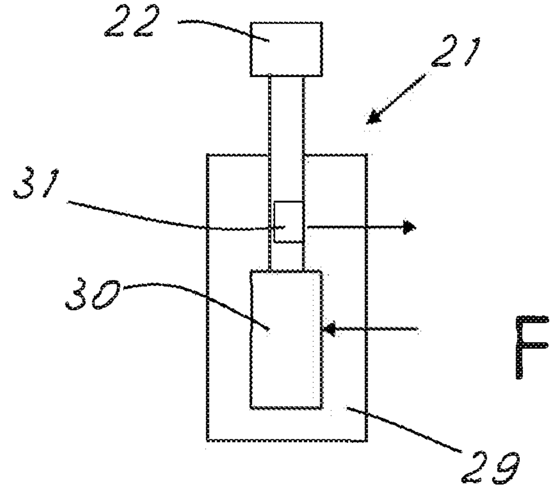
FIG. 3 shows a schematic view of a detail of the device according to the invention.

FIG. 3 shows in schematic form an example of a possible structure of a test head 21. Essentially, a test head 21 may comprise a housing 29 from which the coupling 22 (which may be of the replaceable type) projects. Inside the housing, the coupling 22 is connected to a known controlled brake 30 (for example hydraulic brake) which receives the braking command from the control unit 24. Also present is a known transducer unit or torque and angle sensor 31 which is advantageously connected between the coupling 22 and the brake 30 and which provides torque and angle information which is sent to the control unit 24.

As can be seen in FIGS. 1 and 2, the test heads may be mounted on the frame 20 so as to be directed depending on the specific requirements of the station screwdrivers. As can be seen in the figures by way of example, some of the test heads may be directed upwards, others downwards or also inclined relative to the vertical. This may be done both in order to prevent different screwdrivers from colliding with each other during the test and to allow easier access to the couplings 22 by the screwdrivers. In particular, it may also be envisaged that the couplings are arranged in a manner similar to the elements to be tightened on the objects normally handled by the station. This may be advantageous in order to reduce the need for anomalous movements of the positioning unit 13 of the station. In some stations it may be envisaged that at least some screwdrivers are able to operate only below or only above the object 17 and therefore the associated test heads will be arranged consequently directed downwards or upwards on the frame 20.

For example the station could also be provided with automatic screwdrivers which have only the possibility of performing a linear movement towards or away from the element to be tightened and in this case the associated test head 21 will be located with its coupling in the position normally occupied by the corresponding element to be tightened on the object 17 when the object 17 is in its normal position inside the station.

In any case, if the mobility of the positioning unit 13 of the station is sufficient, the test heads may be arranged not necessarily in the positions of the elements to be tightened normally by the station, but in positions which are considered to be more convenient, for example for the construction or the maintenance of the device 10.

In any case, the arrangement of the test heads, or also the rearrangement of the test heads when there is a change in the characteristics of the station, is facilitated in the case where an open frame 20, in particular grid-like frame, is used, as shown in the figures by way of example.

The control unit 24 of the device may comprise or be connected to a memory 27 which contains test parameters, which may comprise the settings of the test heads and/or the simulation curves and/or the position of the test heads, to be applied for the particular station. In this way, upon arrival of the test device inside the station, this device may be rapidly prepared for the test to be carried in the specific station. With several series of test parameters stored in the memory, each series being associated with a particular station, the test device may adapt to or be adapted rapidly to each station inside which it is inserted.

Advantageously, as an alternative to possible manual control of the test device in order to ensure that the correct series of test parameters are obtained from the memory 27, it may also be envisaged that the control unit of the test device is able to recognize automatically the station into which the device enters, so as to select the correct series of test parameters from the memory 27 and automatically set the test head for testing the screwdrivers of this station.

For example, the plant may comprise several robotic stations and the test device may receive signals for setting its test heads depending on the robotic station into which it enters in order to test the screwdrivers of that specific station.

In this way it may also be envisaged that the test device is introduced onto the transport system which travels through several stations in a plant, whose screwdrivers are to be tested, and the device will automatically be set as it passes through the various stations.

The test device 10 or the control unit 24 may have means (known per se for identifying workstations) for recognizing the station into which the test device enters. In particular, the control unit 24 may comprise or be connected to a device 28 known per se for recognizing the station, whereby said device 28 may be advantageously a contactless recognition device, for example provided with a per se known RFID recognition system or the like, an optical code reader, a magnetic system or a radio system.

Instead of being taken from an internal memory, the parameters for setting the test heads may also be transmitted entirely or partly to the control unit 24 from the outside (for example from a control system of the station) so as to be able to adapt the test heads to specific requirements without memory limitations or the need to determine in advance which parameters must be inserted in the memory of the control unit.

Moreover, it may also be envisaged that the control system 14 of the station may receive a suitable test command (from the control unit 24 of the test device or also from the external management system of the stations), in order to be set to a test mode, for example to ensure that the screwdrivers of the station are coupled together with the corresponding test heads of the device 10 and perform the programmed test cycle for testing all the screwdrivers in the station. In order to reduce the number of test heads in the device 10, it may be envisaged that at least some test heads may move on the frame so as to assume alternately at least two different positions which are suitable for coupling with different screwdrivers.

Figure 4:
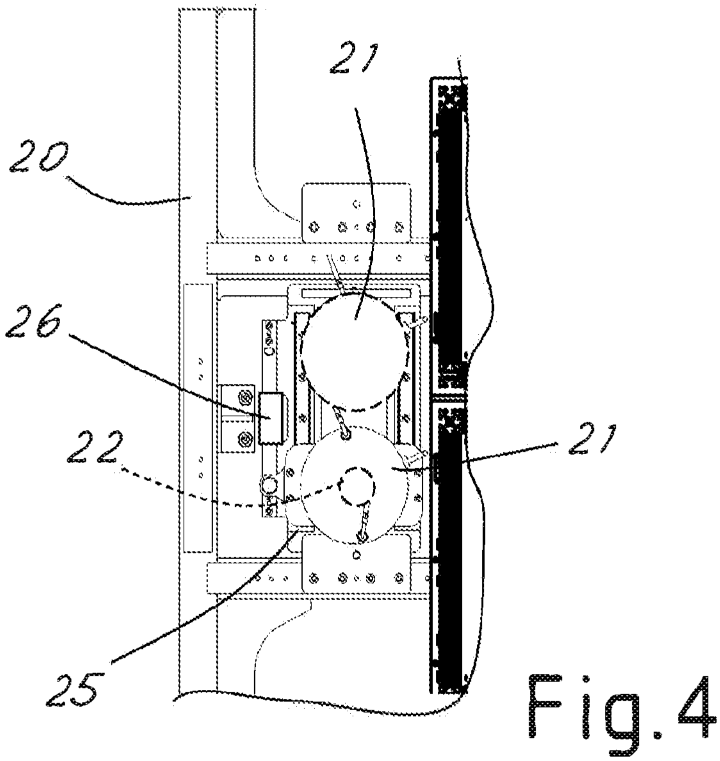
FIG. 4 shows an enlarged, partial, schematic view of a constructional variant of the device according to the invention.

For example. FIG. 4 shows a possible embodiment of a test head 21 with a displacement carriage 25 for being able to move from a first position (shown in solid lines) and a second position (shown in broken lines). The movement may be manual (for example in the case where the device must be adapted to a particular station or series of stations) or advantageously may be controlled by the control unit 24 by means of an actuator 26 in order to carry out the test on two different screwdrivers in the station; the first of which may reach the head only when it is in one of the two positions and the second one of which may reach the head only when it is in the other one of the two positions. The two screwdrivers may thus be tested in sequence by the same test head which moves suitably between the two positions, if necessary following a command from the control unit 24, and based on two different series of parameters depending on the position of the head and the screwdriver to be tested.

At this point it is clear how the objects of the invention have been achieved.

A method according to the invention for testing the screwdrivers in an automatic screwing station comprises essentially providing a test device with a suitable number of suitably arranged test heads 21 and introducing the device into the station as if it were one of the objects normally handled by the station. Advantageously, the test device may also make use of the same system for transporting the objects normally handled by the station, such that the station receives it in a simple and rapid manner.

Still according to the method, the test heads are designed to perform the testing of the various screwdrivers in the station and the station performs the test cycles for its screwdrivers on the test heads of the device introduced therein. The test device may thus detect the performance of the screwdrivers in the station and may signal any non-compliance of the screwdrivers in the station. The setting of the test heads may also be automatically adjusted depending on the station into which the device enters.

Moreover, if necessary, for example owing to the different position of the test heads with respect to the elements to be tightened on an object normally handled by the station, the test device may also be designed to communicate with or in any case be recognized by the station so that the control system of the station may set the station for a test cycle instead of the normal working cycle, as may now be easily imagined by the person skilled in the art.

Obviously the description given above of embodiments applying the innovative principles of the present invention is provided by way of example of these innovative principles and must therefore not be regarded as limiting the scope of the rights claimed herein.

For example, the test heads may be mounted on the frame so as to be displaceable manually into several fixed positions in order to adapt the device to the use with different stations or plants. Moreover, the same frame may have forms different from that shown, in order to adapt the device to different stations and test requirements and/or incorporate or be mounted on different transport frames.

The power for the various electric, electronic and hydraulic circuits of the test device may be supplied to the test device in various known ways, for example by means of on-board electric batteries or by means of connections to an external power supply line. A known electric fluid pump may also be used on the device in order to supply suitable fluid under pressure in the case where the test heads use hydraulic brakes.

The invention claimed is:

1. A test device (10) for testing automatic screwdrivers in a robotic station equipped with a plurality of automatic screwdrivers mounted on positioning units (13) of the robotic station and intended to execute tightening operation on elements of an object entering and handled in the robotic station, wherein the test device (10) comprises: a transport frame intended to be coupled with a transport system for sequential transporting objects inside and outside the robotic station, so as to be transported inside and outside the robotic station in place of an object handled in the robotic station; a frame (20) on the transport frame having a plurality of screwdriver test heads (21) arranged and directed on the frame (20) to be able to be reached by the automatic screwdrivers of the robotic station when the test device is in the robotic station, wherein each test head is movable on the frame (20) by a displacement carriage (25) to assume at least two different positions for coupling with different automatic screwdrivers; a control unit (24) connected to the test heads (21) in order to control the operation of the test heads (21), to control movement of the test heads (21) via the displacement carriage (25), based on the robotic station, and detect tightening parameters of screwdrivers automatically applied to the test heads (21) by the robotic station; and an onboard power source for powering the test heads (21) and the control unit (24).

2. Test device (10) according to claim 1, characterized in that the control unit (21) receives or includes in a memory (27) parameters and test curves for screwdrivers which are selected by the control unit (21) depending on the robotic station into which the test device is introduced.

3. The test device (10) according to claim 1, characterized in that the control unit (24) comprises means (28) for recognizing the robotic station into which the test device enters and sets the test heads (12) for testing the screwdrivers of this robotic station.

4. The test device according to claim 1, characterized in that the test heads are movable on the frame of the test device to change the position on the test device.

5. The test device according to claim 1, characterized in that the frame is made with longitudinal and transverse frame elements which are connected together in order to form a grid-like frame structure.

6. A plant (11, 15) for processing of objects, comprising at least one robotic station (11) equipped with a plurality of automatic screwdrivers (12) mounted on positioning units of the robotic station and intended to execute tightening operation on tighten elements (18) of an object (17) entering the robotic station, and a control system controlling the tightening operations performed by the screwdrivers;

a transport system (15) for sequential transporting of such objects inside the robotic station to execute the tightening operation and outside the robotic station (11) once the tightening operation has been completed, and a test device (10) for testing automatic screwdrivers in the robotic station for tightening elements of the object handled in the robotic station, wherein the test device includes: a transport frame intended to be coupled with the transport system for sequential transporting of the objects inside and outside the robotic station, so as to be transported inside and outside the robotic station in place of an object handled in the robotic station; a frame (20) on the transport frame suitable for being inserted in the robotic station with the transport frame instead of the object being handled in the robotic station; a plurality of screwdriver test heads (21) arranged on the frame (20) to be able to be reached by the automatic screwdrivers of the robotic station when the test device is in the robotic station, wherein each test head is movable on the frame (20) by a displacement carriage (25) to assume at least two different positions for coupling with different automatic screwdrivers; a control unit (24) connected to the test heads (21) in order to control the operation of the test heads (21), to control movement of the test heads (21) via the displacement carriage (25), based on the robotic station, and detect tightening parameters of screwdrivers applied to the test heads (21) by the robotic station; and an onboard power source for powering the test heads (21) and the control unit (24), the robotic station being controllable so as to apply the automatic screwdrivers (12) to the test heads (21) of the test device (10) when the test device (10) enters the robotic station (11) in place of an object (17).

7. The plant according to claim 6, characterized in that it comprises several robotic stations (11), and the test device (10) receives signals to set its test heads (12) depending on the robotic station (11) into which it enters in order to test the screwdrivers of that robotic station.

8. The plant according to claim 6 wherein the test device (10) is further characterized in that the control unit (21) receives or includes in a memory (27) parameters and test curves for screwdrivers which are selected by the control unit (21) depending on the robotic station into which the test device is introduced.

9. The plant according to claim 6 wherein the test device (10) is further characterized in that the control unit (24) comprises means (28) for recognizing the robotic station into which the test device enters and sets the test heads (12) for testing the screwdrivers of this robotic station.

10. A method for testing automatic screwdrivers (12) in a plant according to claim 6 and having a robotic station (11) performing the tightening of elements (18) of an object (17) sequentially handled in the robotic station (11) by means of the transport system, comprising the steps of providing the test device (10) equipped with the plurality of screwdriver test heads (21) and the control unit (24) for controlling the test heads (21) so as to perform screwdriver tests, introducing the test device (10) into the robotic station in place of an object handled in the robotic station, and starting a test cycle of the screwdrivers in the robotic station which results in the robotic station coupling the screwdrivers together with corresponding test heads of the test device and performing tightening cycles on the test heads.

11. The method according to claim 10, characterized in that the test device (10) is made to enter into and exit from the robotic station by means of the transport system (15) which is the same system designed to perform the entry into and exit from the robotic station of the objects handled in the robotic station.

12. The method according to claim 11, characterized in that the test device (10), in order to enter into and exit from the robotic station, is equipped with the transport frame (16)

similar to a transport frame used for the entry into or exit from the robotic station of an object handled in the robotic station.

13. The method according to claim 10, characterized in that the control unit (24) of the test device receives or includes in a memory (27) test parameters to be applied to the test heads depending on the robotic station into which the test device is introduced.

14. The method according to claim 10, characterized in that the control unit (24) of the test device (10) is equipped with means (28) for recognizing the robotic station into which it enters, so as to set the test heads (12) for testing the screwdrivers of this station.

15. The method according to claim 10, characterized in that, upon entry of the test device (10) in a station, the robotic station is set to perform a test cycle with the test heads (12) of the test device.

* * * * *